US010018980B2

(12) United States Patent
Pesonen et al.

(10) Patent No.: US 10,018,980 B2
(45) Date of Patent: Jul. 10, 2018

(54) CONTROLLING A PROCESS WITH SENSOR INFORMATION

(71) Applicant: Rovio Entertainment Ltd, Espoo (FI)

(72) Inventors: Mika Pesonen, Espoo (FI); Teemu Stenhammar, Espoo (FI)

(73) Assignee: ROVIO ENTERTAINMENT LTD, Espoo (FI)

( * ) Notice: Subject to any disclaimer, the term of this patent is extended or adjusted under 35 U.S.C. 154(b) by 523 days.

(21) Appl. No.: 14/493,420

(22) Filed: Sep. 23, 2014

(65) Prior Publication Data

US 2016/0085218 A1 Mar. 24, 2016

(51) Int. Cl.

*G05B 19/42* (2006.01)
*G05B 19/042* (2006.01)
*A63F 13/00* (2014.01)

(52) U.S. Cl.

CPC .......... *G05B 19/0428* (2013.01); *A63F 13/00* (2013.01); *G05B 2219/24162* (2013.01)

(58) Field of Classification Search

USPC ...................................................... 463/25, 29
See application file for complete search history.

(56) References Cited

U.S. PATENT DOCUMENTS

2007/0098235 A1 5/2007 Halavee et al.
2010/0007726 A1 1/2010 Barbieri et al.
2010/0132043 A1* 5/2010 Bjorn ...................... G06F 21/41 726/25
2013/0133055 A1* 5/2013 Ali ...................... H04L 63/0861 726/7
2014/0282153 A1* 9/2014 Christiansen ...... G06Q 30/0201 715/765

FOREIGN PATENT DOCUMENTS

EP 1 621 944 A2 2/2006

* cited by examiner

*Primary Examiner* — Mohammad Ali
*Assistant Examiner* — Sheela S Rao
(74) *Attorney, Agent, or Firm* — Squire Patton Boggs (US) LLP

(57) ABSTRACT

A method and apparatus are provided to control processes, such as industrial processes or computer programs to increase process security and avoid injury to persons. An apparatus, may include a receiver that may be configured to receive sensor information from a sensor. The apparatus may also include at least one processing core that may determine, based on the sensor information, at least one characteristic of a user, and to modify execution of a process based at least in part on the characteristic.

27 Claims, 5 Drawing Sheets

112
120
110
123
130
134
150
160
140
156
145

CONTROLLING A PROCESS WITH SENSOR INFORMATION

FIELD OF INVENTION

The present invention relates to the field of controlling processes, such as for example industrial processes or computer programs.

BACKGROUND OF INVENTION

User accounts are used in various services to enable providing users with customized services. For example, a user may define in a newspaper subscription user account, whether she is interested in sports news. In case she isn't interested in sports, the newspaper may remove sport-related headlines from hypertext transfer protocol, HTTP, information transmitted to the user.

In accounts relating to industrial processes, each operator may have a set of preferences defined for him to enable seamless and low-stress interaction with machinery. For example, a supervisor may have defined in his account information the modules of a nuclear power station control program to which he has access rights. Thereafter, by logging on to his account, the supervisor may be presented with control panels relating to the modules to which he has access. In such a case, the supervisor needn't separately log on to the modules, and the modules may be initialized with his preferences. As supervisors may work in shifts, each supervisor may have different preferences to facilitate seamless work.

In some processes, the set of users that have access may be limited by a purpose of the process. For example, only authorized users may be given access to a corporate safety data network. In some installations, magnetic tokens are distributed to legitimate users to enable their access to the site. In other installations, fingerprint readers are used to enable access to the site for legitimate users. A database of fingerprints of legitimate users may be stored centrally or at fingerprint reader devices.

Some devices are designed to be used only by adult persons. For example, life rafts aboard passenger ships may be designed to be easily usable by adult passengers in case of emergency, but to not be usable by children as playing children might otherwise inappropriately trigger the rafts. For example, the triggering mechanism may be placed high so that a child cannot reach it, or the triggering mechanism may require muscle strength only an adult will have. Steering mechanisms of cars are built so that a small child would have difficulty using both the pedals and the steering wheel at the same time due to his small size.

SUMMARY OF THE INVENTION

In accordance with a first aspect of the present invention, there is provided an apparatus comprising a receiver configured to receive first sensor information from a first sensor, and at least one processing core configured to determine, based at least in part on the first sensor information, at least one characteristic of a user, and to modify execution of a process based at least in part on the at least one characteristic.

Various embodiments of the first aspect comprise at least one feature from the following bulleted list:

- the receiver is further configured to receive second sensor information from a second sensor, and the at least one processing core is further configured to determine the at least one characteristic based at least in part on the second sensor information
- the first sensor is comprised in the list: acceleration sensor, imaging sensor, gyroscope, microphone
- the at least one characteristic comprises whether the user is a child, and the at least one processing core is configured to modify execution of the process by preventing execution of the process responsive to a determination the user is a child
- the at least one characteristic comprises at least one of age and gender of the user, and the at least one processing core is configured to modify execution of the process by selecting first information to provide to the user based on at least one of the age and the gender of the user
- the at least one processing core is configured to cause transmission, to a server, of information describing the first sensor and the second sensor
- the at least one processing core is further configured to check whether the determined at least one characteristic is consistent with a corresponding at least one stored characteristic of the user
- the at least one processing core is configured to perform the determination locally in the apparatus without relying on computing resources external to the apparatus
- the at least one processing core is further configured to associate the at least one determined characteristic with an identifier of the user
- the at least one processing core is configured to suspend a session of the user responsive to the determined at least one characteristic not being consistent with the corresponding at least one stored characteristic of the user
- the at least one processing core is configured to determine the at least one characteristic as a background task while performing at least one further task
- the further task is a game program
- the first information comprises safety information selected in dependence of a determined age characteristic of the user
- the first information comprises at least one advertisement.

In accordance with a second aspect of the present invention, there is provided a method comprising receiving first sensor information from a first sensor, determining, based at least in part on the first sensor information, at least one characteristic of a user, and modifying execution of a process based at least in part on the at least one characteristic.

Various embodiments of the second aspect comprise at least one feature from the following bulleted list:

- the method further comprises receiving second sensor information from a second sensor, and wherein the at least one characteristic is determined the based at least in part on the second sensor information
- the first sensor and the second sensor are comprised in the list: acceleration sensor, imaging sensor, gyroscope, microphone
- the at least one characteristic comprises whether the user is a child, and the method further comprises modifying execution of the process by preventing execution of the process responsive to a determination the user is a child
- the at least one characteristic comprises at least one of age and gender of the user, and the method further comprises modifying execution of the process by selecting first information to provide to the user based on at least one of the age and the gender of the user the method further comprises checking whether the determined at least one characteristic is consistent with a corresponding at least one stored characteristic of the user the determination is performed locally without relying on external computing resources the method further comprises associating the at least one determined characteristic with an identifier of the user the method further comprises suspending a session of the user responsive to the determined at least one characteristic not being consistent with the corresponding at least one stored characteristic of the user the method further comprises determining the at least one characteristic as a background task while performing at least one further task the further task is a game program the first information comprises safety information selected in dependence of a determined age characteristic of the user the first information comprises at least one advertisement the method further comprises receiving a plurality of advertisements and information associating each of the advertisements with a characteristic.

In accordance with a third aspect of the present invention, there is provided an apparatus comprising means for receiving first sensor information from a first, means for determining, based at least in part on the first sensor information, at least one characteristic of a user, and means for modifying execution of a process based at least in part on the at least one characteristic.

In accordance with a fourth aspect of the present invention, there is provided a non-transitory computer readable medium having stored thereon a set of computer readable instructions that, when executed by at least one processor, cause an apparatus to at least receive first sensor information from a first sensor, determine, based at least in part on the first sensor information, at least one characteristic of a user, and modify execution of a process based at least in part on the at least one characteristic.

INDUSTRIAL APPLICABILITY

At least some embodiments of the present invention find industrial application in the field of controlling processes, such as for example industrial processes or computer programs, for example to increase process security and avoid injury to persons.

DETAILED DESCRIPTION OF EXAMPLE EMBODIMENTS

Characterizing a user based on sensor information enables, depending on the embodiment, verifying the user's identity, selecting information to present to the user or limiting use of a device to users of a certain type, such as adults for example. Information from more than one sensor may be used.

Figure 1:
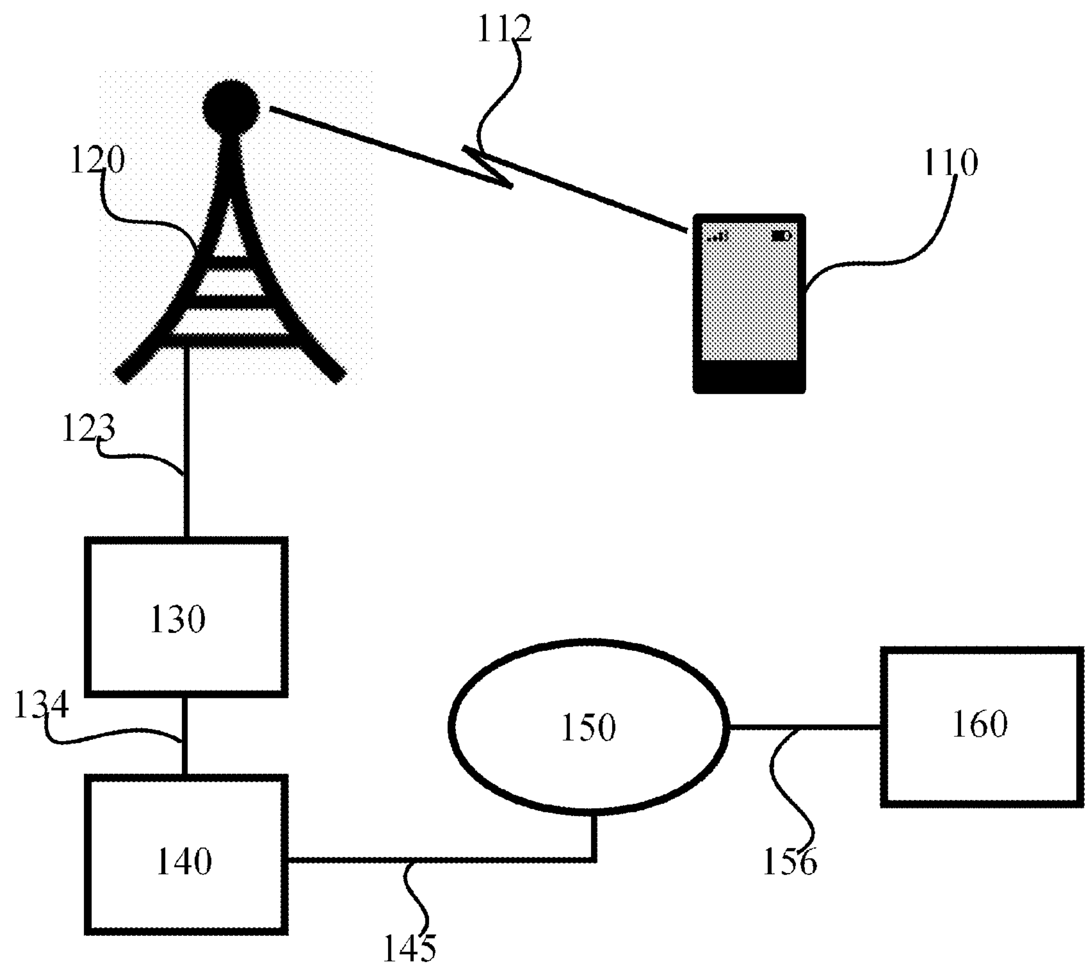
FIG. 1 illustrates an example system capable of supporting at least some embodiments of the present invention.

FIG. 1 illustrates an example system capable of supporting at least some embodiments of the present invention. The system of FIG. 1 comprises device 110, which may comprise a smartphone, cellular phone, tablet device, phablet device, laptop or desktop computer, or other suitable electronic device, for example. Device 110 may comprise a user interface, which may comprise a touchscreen user interface or a keypad plus display user interface, for example. Device 110 may comprise at least one, and in some embodiments at least two, sensors. Sensors may comprise, for example, an acceleration sensor, an imaging sensor, a gyroscope and/or a microphone. An imaging sensor may be comprised in a camera.

In the system of FIG. 1, device 110 is communicatively coupled to base station 120 via link 112. Base station 120 may be configured to operate in accordance with at least one wireless technology, such as wideband code division multiple access, WCDMA, long term evolution, LTE, IS-95 or wireless local area network WLAN, which is also known as Wi-Fi. Link 112 conforms to a technology that base station 120 and device 110 are configured to support. Link 112 may be two-way in that it may comprise a downlink for transferring information from base station 120 to device 110, and an uplink for transferring information from device 110 to base station 120. In case base station 120 only supports WLAN and not a cellular technology such as WCDMA or IS-95, it may alternatively be known as an access point but in the present document, the term base station is used throughout for clarity. In some embodiments, instead of a wireless link, link 112 comprises a wire-line link with a communication node that is communicatively coupled with network 150.

In the system of FIG. 1, base station 120 is communicatively coupled, via connection 123, to network node 130. Network node 130 may comprise a radio network controller, switch or other network node. Network node 130 is communicatively coupled, via connection 134, to gateway 140. Gateway 140 in turn is connected to network 150 via connection 145. Each of connections 123, 134 and 145 may be wire-line or at least in part wireless. Not all of connections 123, 134 and 145 need to be of the same type. In some embodiments, network node 130 and/or gateway 140 are absent, leaving base station 120 in more direct contact with network 150. Network 150 may comprise the Internet, or a corporate network, for example. Server 160 is communicatively coupled with network 160 via connection 156.

Device 110 may communicate with server 160 via base station 120, network node 130, gateway 140 and network 160. This communication may be two-way. For example, server 160 may host a process that a user interface comprised in device 110 is configured to, at least in part, control.

A user of device 110 may have a user identity registered in server 160, or in a node acting together with server 160. The user identity may be associated with a profile characterizing the user, wherein the profile may comprise user characteristics that may be verified using sensor information obtained from at least one sensor comprised in device 110. For example, the profile may characterize features of the user's voice, facial features, his or her gait or manner of moving device 110 while using it.

In general, characteristics of a user may be definable in a number of ways. For example, a user's gait may be characterized using acceleration sensor information to estimate frequencies and amplitudes of movements typically present in the way the user walks. A person with longer legs will have larger amplitudes in movement than a person with shorter legs. Wearing high heels may affect a rhythm of a gait. For example, a user's voice may comprise a characteristic base frequency, which may be lower for males and higher for females. For example, the user may have a characteristic breathing frequency and sound type. A smoker may take more frequent breaths and/or deeper breaths than a physically fit individual. An overweight individual may take rapid, shallow breaths. Breathing sounds may be captured via a microphone comprised in a device, such as for example device 110.

A camera comprising an imaging sensor may be used to characterize the user. Where device 110 comprises a camera, the user may be prompted to take a picture of himself or herself. Alternatively, where device 110 comprises a so-called front-facing camera, for example for video calls, device 110 may switch it on and monitor the camera feed from the front-facing camera, to detect when the user's face is comprised in the feed. This may be accomplished using an image-recognition algorithm, for example. Once the user's face is captured, the camera may be switched off. Using the image, comprising image sensor information, the user may be characterised. For example, the user's gender may be tentatively determined using hairstyle and facial proportions. Also whether the user is a child may be estimated using proportions of the eyes and face, and/or distance between the eyes. In other words, a characteristic of the current user may be determined based on the sensor information. Examples of the characteristic include various facial proportions.

Device 110 may analyse at least one characteristic of a user derived based at least in part on sensor information from at least one sensor comprised in device 110. For example, device 110 may use acceleration sensor data to collect information on the user's gait, and match the characteristics of the gait with stored reference data device 110 is configured with. A best match may be selected, for example by defining a gait in terms of amplitude and frequency, and determining which item of stored reference data is closest in terms of amplitude and frequency.

In general, determining a best match between a characteristic, or characteristics, and reference data may comprise using a sum of squares method. In the sum of squares method, for each element in the characteristic, a corresponding element of a reference data item is subtracted therefrom, and the squares of the differences obtained by subtraction are summed together. In other words, the characteristic and the reference data items are expressed as vectors of equal length. A difference vector is obtained by subtracting a first one of the characteristic vector and the reference data item vector from the other one. After this, each element of the difference vector is squared, and the squared elements are summed. The reference data item with a lowest sum of squared difference, thus obtained, is considered the closest match in the sum of squares method. An example of a characteristic vector relating to gait is {gait_amplitude, gait_frequency} where gait_amplitude is an amplitude of the gait and gait_frequency a frequency of the gait.

Alternatively to a sum of squares method, a criterion method may be employed to analyse characteristics of a user. For example, from acceleration sensor data, a characteristic amplitude may be determined characterizing the user's gait, which is associated with lower limb length. A criterion may be assigned relating to the amplitude, with users with a characteristic gait amplitude exceeding the criterion being classified as being likely male. Likewise a frequency criterion may be assigned to gait, with users with a characteristic gait frequency exceeding the criterion being classified as likely children.

The reference data items may be stored in device 110 at manufacture, or when installing software to device 110 after manufacture, such as for example over the air. In some embodiments, where sensor information is used to verify the user is who he claims to be, the reference data is formed in device 110 or server 160 based on collecting sensor information while the user uses device 110, and deriving from the collected sensor information the reference data item or items. For example, when a user of a mobile phone talks over the phone, his voice can be characterized for at least one of base frequency and word pacing. Alternatively or additionally, if it can be determined the user is walking while talking, his gait may be characterized using data from an acceleration sensor comprised in device 110.

Device 110 or server 160 may determine if a current user using device 110 is the legitimate user, for example by determining, using for example the sum of squares method, how well sensor information gathered while the current user uses the device matches with previously gathered sensor information gathered while the legitimate user used the device 110. This comparing may be performed, for example, by comparing characteristics derived from the sensor information. Responsive to the sum of squares being larger than a predefined threshold, the current user may be requested to input a passcode before being allowed to continue use, for example. In some embodiments, in addition to sensor information characterizing the legitimate user, device 110 and/or server 160 collects information that characterizes how variable the legitimate user's behaviour is. For example, gait can be observed for both characteristics of the gait and variance of these characteristics. The threshold defining when a characteristic determined based on sensor information gathered while the current user uses the device differs meaningfully from a characteristic determined based on sensor information gathered while the legitimate user used the device may then be set at least in part based on the variance. In some embodiments, sensor information gathered while the current user uses the device may be compared directly with sensor information gathered while the legitimate user used the device.

Device 110 or server 160 may be configured to monitor whether the current user is the legitimate user while the current user uses device 110. For example, as the current user uses device 110 to place telephone calls, interact with data and/or play games, characteristics of the current user may be determined based on sensor information gathered while the current user uses device 110, and compared to sensor information or characteristics relating to the legitimate user. Responsive to the current users' characteristics differing from those of the legitimate user, the current user may be prompted to provide a passcode, or device 110 may even be locked.

In some embodiments, a characteristic of a current user is compared to a characteristic of a legitimate user in connection with the current user logging in to device 110, or to an account in server 160. Responsive to these two characteristics differing from each other by more than a predetermined amount, access may be denied or an additional verification may be required.

A user may be characterized based on sensor information from one or more sensors. Sensor information from more than one sensor may be combined to produce a characteristic, for example where the characteristic is expressed as a vector, a first subset of the elements of the vector might be influenced by only sensor information from a first sensor, and a second subset of the elements of the vector might be influenced by only sensor information from a second sensor. For example, the characteristic may be expressed as {gait_amplitude, voice_pitch}, where gait_amplitude is determined based on acceleration sensor information and voice_pitch is determined based on microphone sensor information. Characteristics based on sensor information from more than one sensor may be analysed using the criterion method or the sum of squares method, for example.

Where characteristics are determined based on input from more than one sensor, reference data may be present in device 110 or it may be requested, for example from server 160. Device 110 may inform server 160 of sensors enabled in device 110, and server 160 may responsively provide reference data usable with the enabled sensors.

Analysing user characteristics may be used when selecting information to provide to the user. For example, the user may be characterized as laid out above, to select appropriate information to display or play in audio form. For example, where device 110 is a control device arranged to modify parameters of an industrial process, and device 110 or server 160 classifies the current user as a child, it may be configured to display a "put this down" message on a screen comprised in device 110, or to emit a "do not use" audio signal. This may enhance industrial security. Alternatively, where user classification is done, device 110 or server 160 may be configured to select advertisements to provide, in visual, audio or audiovisual format, to the current user based on the classification. For example, selecting advertisements based on gender may increase their effectiveness. Advertisements may alternatively or additionally be selected based on a determined age of the current user. When advertisements are selected for displaying, server 160 may comprise an advertisement distribution server configured to provide targeted advertising campaigns aimed at users of consumer devices.

In some embodiments, analysing user characteristics is performed in device 110 without providing sensor information or characteristics derived from sensor information to server 160 or to another node. An advantage of this architecture is that user information, such as characteristics of his or her physical build or voice, are kept only on device 110 and not communicated over a network, which might compromise the confidentiality of such personal information.

Figure 2:
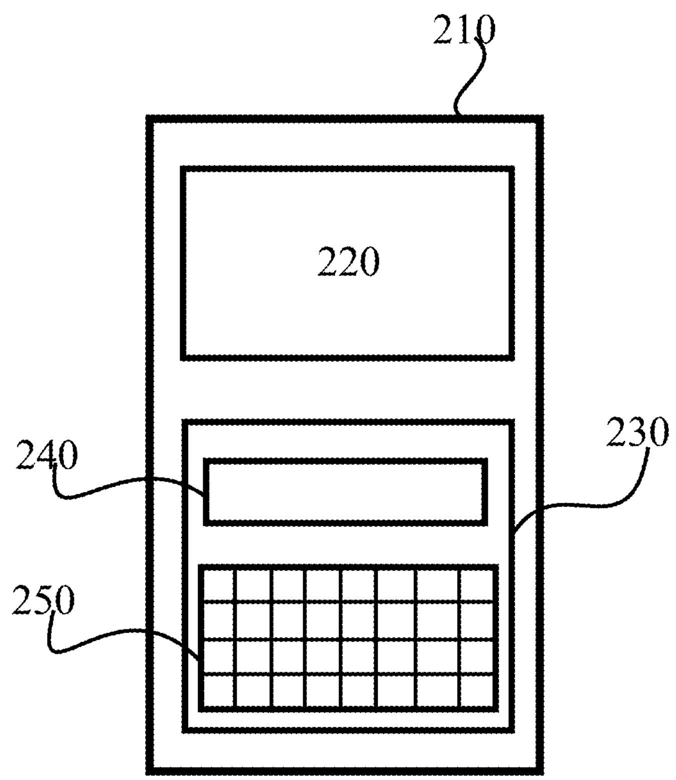
FIG. 2 illustrates an example use case in accordance with at least some embodiments of the present invention.

FIG. 2 illustrates an example use case in accordance with at least some embodiments of the present invention. FIG. 2 illustrates a display 210 of device 110 of FIG. 1.

The view of FIG. 2 illustrates a situation where device 110 or server 160 has determined that the current user is not necessarily the legitimate user, based for example on comparing at least one characteristic of the current user to a corresponding characteristic of the legitimate user. On display 210 is displayed an indication 220 that a passcode must be input before use of device 110 can continue. An input interface 230 is provided for entering the passcode. The input interface 230 comprises an input field 240 and a keyboard 250 to enable the current user to input the passcode.

Figure 3:
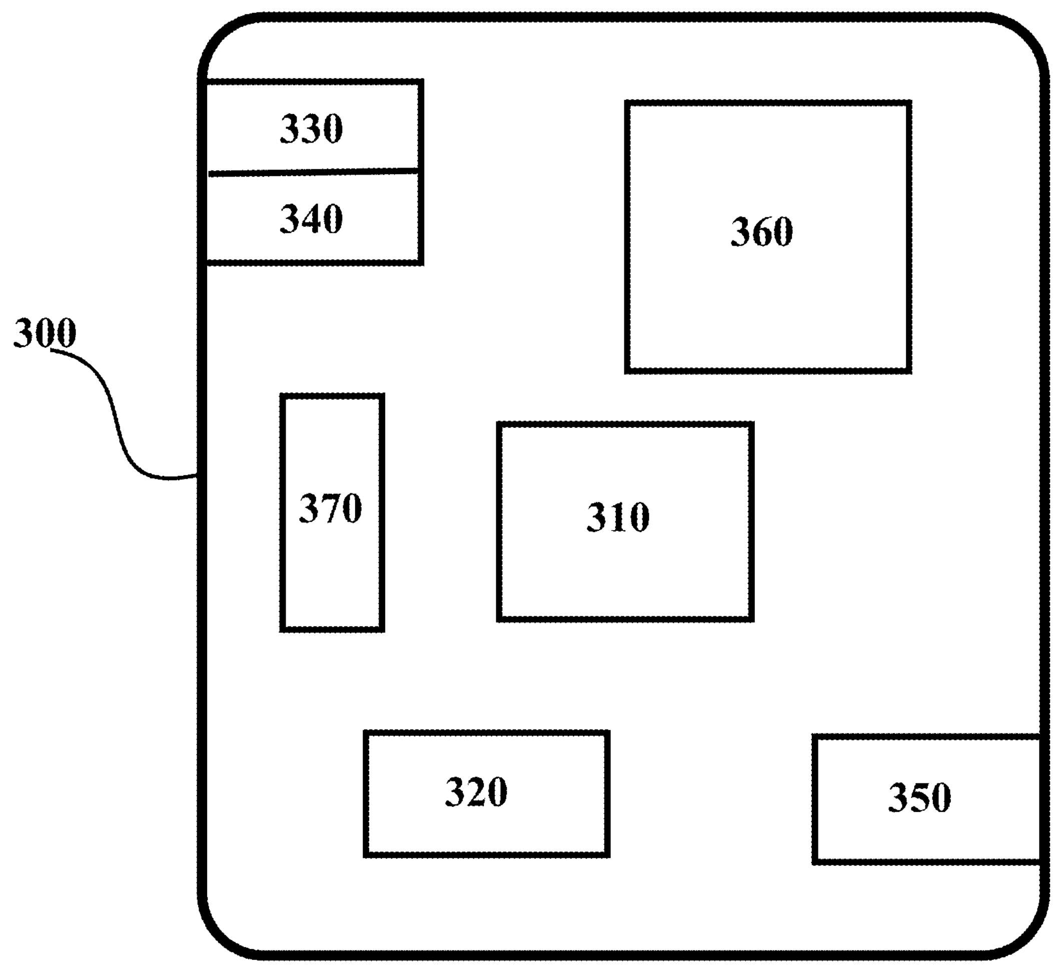
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device 110 of FIG. 1. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
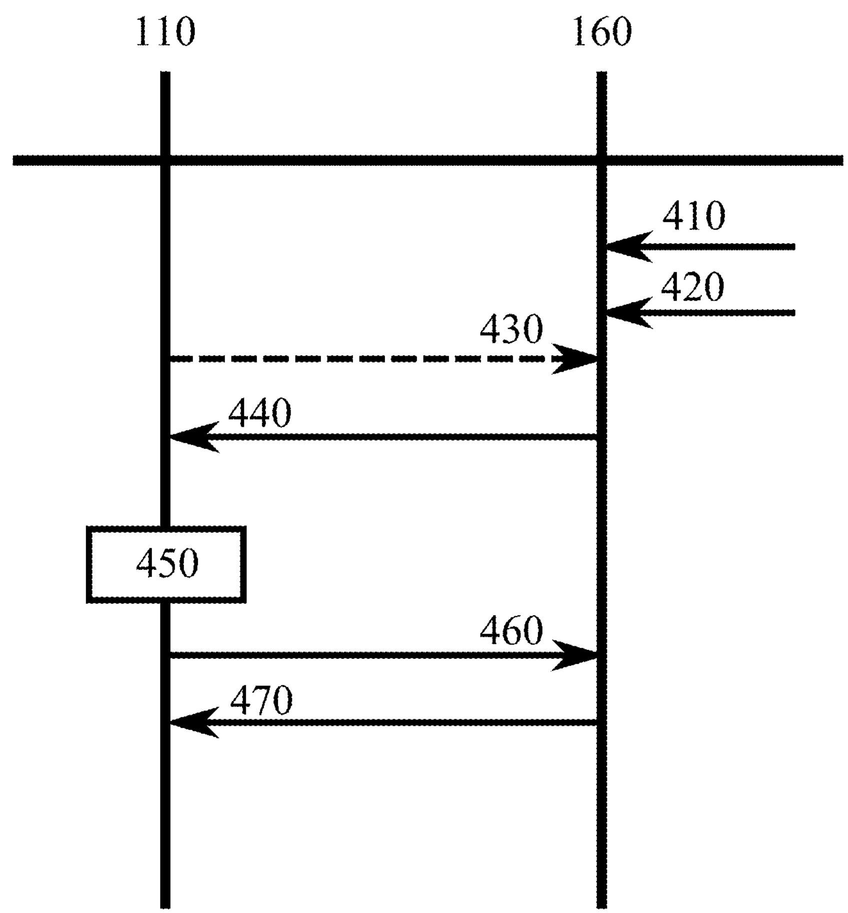
FIG. 4 illustrates signalling in accordance with at least some embodiments of the present invention.

FIG. 4 illustrates signalling in accordance with at least some embodiments of the present invention. On the vertical axes are disposed, on the left, device 110, and on the right, server 160. Time advanced from top toward the bottom.

In phases 410 and 420, server 160, which in the illustrated embodiment comprises an advertisement server, receives from advertisers information concerning advertisements and their target audience. The received information may comprise media content of advertisement, such as images, audio clips and/or video clips. The received information may comprise age and/or gender definitions of target audiences for advertisements.

In optional phase 430, device 110, or an application running on device 110, reports to server 160 that it is running and enabled to receive advertising content. In some embodiments, device 110 informs server 160 in phase 430 concerning sensors available in device 110 for characterizing the user.

In phase 440, server 160 provides to device 110 information concerning characteristics of at least one target audience of at least one advertisement that server 160 has received information on. In embodiments where, in phase 430, device 110 informed server 160 of sensors present in device 110, server 160 may in phase 440 provide reference data to device 110 that is usable with the sensors device 110 has.

In phase 450, device 110 gathers sensor information from one, and in some embodiments from at least two, sensors comprised in device 110. At least one characteristic of the current user may be determined based at least in part on the gathered sensor information. Responsive to a determination that at least one characteristic of the current user of device 110 seems to match a target audience characteristic received in device 110 in phase 440, device 110 informs server 160 of this, which is illustrated in FIG. 4 as phase 460.

As a response to the message of phase 440, server 160 responsively, in phase 470, provides media content associated with the target audience definition to device 110.

In some embodiments, server 160 provides media content associated with more than one target audience characteristic to device 110, and device 110 provides media content associated with a characteristic that matches a characteristic of the current user of device 110. An advantage of this is that server 160 is not informed concerning a characteristic of the current user, protecting his or her privacy.

Figure 5:
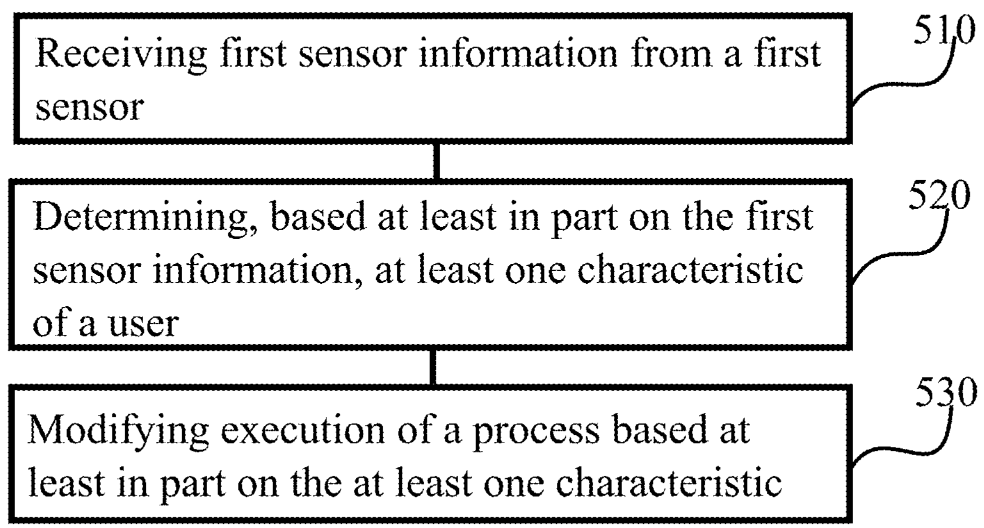
FIG. 5 is a first flow chart of a first method in accordance with at least some embodiments of the present invention.

FIG. 5 is a first flow chart of a first method in accordance with at least some embodiments of the present invention. The phases of the illustrated method may be performed in device 110, or in a control device configured to control the functioning of device 110, when implanted therein, for example.

Phase 510 comprises receiving first sensor information from a first sensor. Phase 520 comprises determining, based at least in part on the first sensor information, at least one characteristic of a user. Finally, phase 530 comprises modifying execution of a process based at least in part on the at least one characteristic.

In some embodiments, the at least one characteristic is determined based on second sensor information from a second sensor in addition to the first sensor information. The first and second sensors may be comprised in a device performing the method.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:

at least one sensor;

a receiver configured to receive information from the at least one sensor;

at least one processing core configured to determine at least one characteristic of a user based at least in part on the information received from the at least one sensor, and to modify execution of a process based at least in part on the at least one characteristic, wherein the at least one characteristic of the user is expressed by a characteristic vector comprising at least one element of the information received from the at least one sensor; and a memory storing at least two reference data items comprising reference data item vectors, wherein the at least one processing core is further configured to monitor whether the user is a legitimate user at the same time that the apparatus is being used by the user based at least on the determined at least one characteristic of the user, wherein the information received from the at least one sensor and the at least one characteristic of the user are updated at the same time that the apparatus is being used by the user, and wherein the at least one processing core is configured to determine the at least one characteristic of the user by determining a best match between the characteristic vector and the at least two reference data item vectors using a sum of squares method comprising:

obtaining a difference vector by subtracting a first one of the characteristic vector and a reference data item vector, squaring each element of the difference vector, summing the squared elements of the difference vector, repeating the obtaining and the squaring and the summing for the at least two reference data items, and considering the at least two reference data items with a lowest sum of squared difference as the closest match with the characteristic vector.

2. The apparatus according to claim 1, wherein the at least one sensor is comprised in the list: acceleration sensor, imaging sensor, gyroscope, microphone.

3. The apparatus according to claim 1, wherein the at least one characteristic comprises whether the user is a child, and the at least one processing core is configured to modify execution of the process by preventing execution of the process responsive to a determination the user is a child.

4. The apparatus according to claim 1, wherein the at least one processing core is configured to cause transmission, to a server, of information describing the at least one sensor.

5. The apparatus according to claim 1, wherein the at least one characteristic comprises at least one of age and gender of the user, and the at least one processing core is configured to modify execution of the process by selecting first information to provide to the user based on at least one of the age and the gender of the user.

6. The apparatus according to claim 5, wherein the first information comprises safety information selected in dependence of a determined age characteristic of the user.

7. The apparatus according to claim 5, wherein the first information comprises at least one advertisement.

8. The apparatus according to claim 1, wherein the at least one processing core is further configured to check whether the determined at least one characteristic is consistent with a corresponding at least one stored characteristic of the user.

9. The apparatus according to claim 8, wherein the at least one processing core is configured to suspend a session of the user responsive to the determined at least one characteristic not being consistent with the corresponding at least one stored characteristic of the user.

10. The apparatus according to claim 1, wherein the at least one processing core is configured to perform the determination locally in the apparatus without relying on computing resources external to the apparatus.

11. The apparatus according to claim 1, wherein the at least one processing core is further configured to associate the at least one determined characteristic with an identifier of the user.

12. The apparatus according to claim 1, wherein the at least one processing core is configured to determine the at least one characteristic as a background task while performing at least one further task.

13. The apparatus according to claim 12, wherein the further task is a game program.

14. A method of operating an apparatus, comprising:

receiving sensor information from at least one sensor of the apparatus;

determining at least one characteristic of a user based at least in part on the information received from the at least one sensor, wherein the at least one characteristic of the user is expressed by a characteristic vector comprising at least one element of the information received from the at least one sensor;

storing at least two reference data items comprising reference data item vectors;

modifying execution of a process based at least in part on the at least one characteristic;

monitoring whether the user is a legitimate user at the same time that the apparatus is being used by the user based at least on the determined at least one characteristic of the user;

updating the sensor information and the at least one characteristic of the user at the same time that the apparatus is being used by the user, wherein the determining the at least one characteristic of the user is performed by determining a best match between the characteristic vector and the at least two reference data item vectors using a sum of squares method comprising:

obtaining a difference vector by subtracting a first one of the characteristic vector and a reference data item vector, squaring each element of the difference vector, summing the squared elements of the difference vector, repeating the obtaining, the squaring and the summing for the at least two reference data items, and considering the at least two reference data items with a lowest sum of squared difference as the closest match with the characteristic vector.

15. The method according to claim 14, wherein the at least one sensor is comprised in the list: acceleration sensor, imaging sensor, gyroscope, microphone.

16. The method according to claim 14, wherein the at least one characteristic comprises whether the user is a child, and the method further comprises modifying execution of the process by preventing execution of the process responsive to a determination the user is a child.

17. The method according to claim 14, wherein the at least one characteristic comprises at least one of age and gender of the user, and the method further comprises modifying execution of the process by selecting first information to provide to the user based on at least one of the age and the gender of the user.

18. The method according to claim 17, wherein the first information comprises safety information selected in dependence of a determined age characteristic of the user.

19. The method according to claim 17, wherein the first information comprises at least one advertisement.

20. The method according to claim 19, wherein the method further comprises receiving a plurality of advertisements and information associating each of the advertisements with a characteristic.

21. The method according to claim 14, further comprising checking whether the determined at least one characteristic is consistent with a corresponding at least one stored characteristic of the user.

22. The apparatus according to claim 21, comprising suspending a session of the user responsive to the determined at least one characteristic not being consistent with the corresponding at least one stored characteristic of the user.

23. The method according to claim 14, wherein the determination is performed locally without relying on external computing resources.

24. The method according to claim 14, further comprising associating the at least one determined characteristic with an identifier of the user.

25. The method according to claim 14, comprising determining the at least one characteristic as a background task while performing at least one further task.

26. The method according to claim 25, wherein the further task is a game program.

27. A non-transitory computer readable medium having stored thereon a set of computer readable instructions that, when executed by at least one processor, cause an apparatus to at least:

receive sensor information from at least one sensor of the apparatus;

determine at least one characteristic of a user based at least in part on the information received from the at least one sensor, wherein the wherein the at least one characteristic of the user is expressed by a characteristic vector comprising at least one element of the information received from the at least one sensor;

store at least two reference data items comprising reference data item vectors;

modify execution of a process based at least in part on the at least one characteristic;

monitor whether the user is a legitimate user at the same time that the apparatus is being used by the user based at least on the determined at least one characteristic of the user;

update the sensor information and the at least one characteristic of the user at the same time that the apparatus is being used by the user, wherein the determining of the at least one characteristic of the user is performed by determining a best match between the characteristic vector and the at least two reference data item vectors using a sum of squares method causing the apparatus to:

obtain a difference vector by subtracting a first one of the characteristic vector and a reference data item vector, square each element of the difference vector, sum the squared elements of the difference vector, repeat the obtaining, the squaring and the summing for the at least two reference data items, and consider the at least two reference data items with a lowest sum of squared difference as the closest match with the characteristic vector.

* * * * *